United States Patent
Lee et al.

(10) Patent No.: US 6,809,805 B2
(45) Date of Patent: Oct. 26, 2004

(54) RESIDUAL STRESS MEASURING DEVICE FOR OPTICAL FIBER

(75) Inventors: Jae-Ho Lee, Kumi-shi (KR); Sung-Koog Oh, Kumi-shi (KR)

(73) Assignee: Samsung Electronics Co., LTD, Gyeonggi-do (KR)

(*) Notice: Subject to any disclaimer, the term of this patent is extended or adjusted under 35 U.S.C. 154(b) by 51 days.

(21) Appl. No.: 10/374,893

(22) Filed: Feb. 26, 2003

(65) Prior Publication Data

US 2003/0174310 A1 Sep. 18, 2003

(30) Foreign Application Priority Data

Mar. 18, 2002 (KR) ........................................ 2002-14509

(51) Int. Cl.[7] ............................................. G01N 21/00
(52) U.S. Cl. ................................................... 356/73.1
(58) Field of Search ................................ 356/73.1, 426

(56) References Cited

U.S. PATENT DOCUMENTS 4,882,497 A * 11/1989 Inoue et al. ............ 250/559.08
5,108,173 A * 4/1992 Achurch et al. ............ 356/73.1

* cited by examiner

Primary Examiner—Frank G. Font
Assistant Examiner—Amanda Merlino
(74) Attorney, Agent, or Firm—Cha & Reiter LLC

(57) ABSTRACT

The present invention relates to an apparatus for measuring the residual stress in an optical fiber which includes: a fixating unit for fixating an optical fiber with residual stresses to be measured therein; and a measuring unit comprising a light generator for generating a light for measuring the residual stresses in the optical fiber and a detector for detecting phase changes of the light that has been generated by the light generator; wherein the measuring unit measures the residual stresses in the optical fiber based on the phase changes of the light passed through the optical fiber, while the measuring unit is rotating along with the circumference of the optical fiber.

8 Claims, 3 Drawing Sheets

RESIDUAL STRESS MEASURING DEVICE FOR OPTICAL FIBER

CLAIM OF PRIORITY

This application claims priority to an application entitled "RESIDUAL STRESS MEASURING DEVICE FOR OPTICAL FIBER," filed in the Korean Industrial Property Office on Mar. 18, 2002 and assigned Serial No. 2002-14509, the contents of which are hereby incorporated by reference.

BACKGROUND OF THE INVENTION

1. Field of the Invention

The present invention relates generally to an optical fiber, and more particularly, to a device for measuring residual stress of an optical fiber.

2. Description of the Related Art

It is a common during the course of fabricating an optical fiber that a part of stress does not get completely removed from the optical fiber. This type of undesirable stress in the optical fiber is known as residual stress. As such, the measurement of residual stress is an essential element in the production of high-quality optical fibers.

The residual stress that is typically generated during the fetch process, which performed at a high temperature as one phase of the production process of an optical fiber, increases light loss due to the light scattering of the optical fiber and causes the refractive index to change because of the photoelastic phenomenon. Therefore, in order to fabricate a high-quality optical fiber, more research efforts must be given to the development of optical fiber production (fetch) technologies for suppressing the residual stress. At the same time, it is also necessary to develop appropriate equipments for performing a precise measurement of the residual stress in an optical fiber.

As an attempt to release some of the residual stress in an optical fiber, a long-period fiber grating has been under development. In order to study the spectrum transmittance characteristic of such element and to perform researches on the improvement of such characteristics, any changes in the refractive index due to the change in the residual stress as well as the distribution of the residual stress along the longitudinal direction of the optical fiber must be measured on a regular basis. Particularly, in-depth studies should be done in connection with the changes in the refractive index due to the residual stress—that is, the changes in the distribution of doping material under the influence of photoelastic effect and a nonlinear phenomenon. To implement such studies, however, a special kind of measurement device, which is capable of making three-dimensional measurement and observing of the residual stress of an optical fiber and its photoelastic effect, is absolutely required.

In general, the measurement of the residual stress in an optical fiber or in an optical fiber preform is achieved using the photoelastic effect. The photoelastic effect relates a phenomenon that the refractive index of a medium changes in accordance with the direction of the residual stress remaining in the medium. Because of this photoelastic effect, the refractive index of an optical fiber or its preform tend to change according to a polarizing direction of light.

The measurement of the residual stress in an optical fiber was first introduced in the Journal of P. L. Chu and T. Whitebread, "Measurement of stresses in optical fiber and preform, Appl. Opt. 1982, 21, pp. 4241~4245". In the Journal, a number of studies have been performed on the measurement and its related measuring device. Further, a method for calculating residual stresses in an optical fiber through the phase changes of a transmitted light by photoelastic effect is already disclosed in the U.S. patent application Ser. No. 09/803,873, filed on Mar. 13, 2001 by the Applicant.

FIG. 1 is an explanatory diagram of the device for measuring the residual stresses in an optical fiber according to a related art. As depicted in the drawing, the residual stress measuring device for an optical fiber 10 includes a light generator 11, a lens system 13, a reflecting mirror 15, a focusing lens unit 17a, an objective lens 17b, and a detector 19. In operation, an optical fiber 30b with residual stresses is fixated on a designated flat plate 30a, and the plate is disposed between the focusing lens unit 17a and the objective lens 17b.

The light outputted from the light generator 11 passes through the lens system 13, then converted to a plane wave, which in turn incidents on the optical fiber 30b through the reflecting mirror 15 and the focusing lens unit 17a. Then, the phase of the incident light upon the optical fiber 30b changes depending on whether or not there is residual stress in the optical fiber. To calculate the residual stress, the detector 19 detects a polarized light towards a certain direction from the objective lens 17b.

However, the above-described method, i.e., measuring the residual stress in the optical fiber fixated on the flat plate, can measure the residual stress from one direction only. Therefore, to be able to measure the residual stress in other directions, the optical fiber should be reset toward the direction according to the desired measurement direction. As a result, the frequent changes in the experiment conditions tend to cause an erroneous measurement of the residual stress.

Accordingly, the conventional method has drawbacks in that it makes difficult to perform a three-dimensional measurement of the distribution of residual stress and as well as the measurement of asymmetry of the distribution of the residual stress in an optical fiber.

SUMMARY OF THE INVENTION

The present invention overcomes the above-described problems, and provides additional advantages, by providing a method and apparatus for measuring a residual stress in an optical fiber that is capable of obtaining a more accurate distribution of the residual stress in the optical fiber.

According to an embodiment of the present invention, a device for measuring a residual stress of an optical fiber includes: a fixating unit for fixating an optical fiber having residual stresses to be measured therein; a measuring unit comprising a light generator for generating a light for measuring the residual stresses in the optical fiber and a detector for detecting phase changes of the light that has been generated by the light generator; wherein the measuring unit measures the residual stresses in the optical fiber based on the phase changes of the light passed through the optical fiber, while the measuring unit is rotating along with the circumference of the optical fiber.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. For the purposes of clarity and simplicity, well-known functions or constructions are not described in detail since as would obscure the invention in unnecessary detail.

Figure 1:
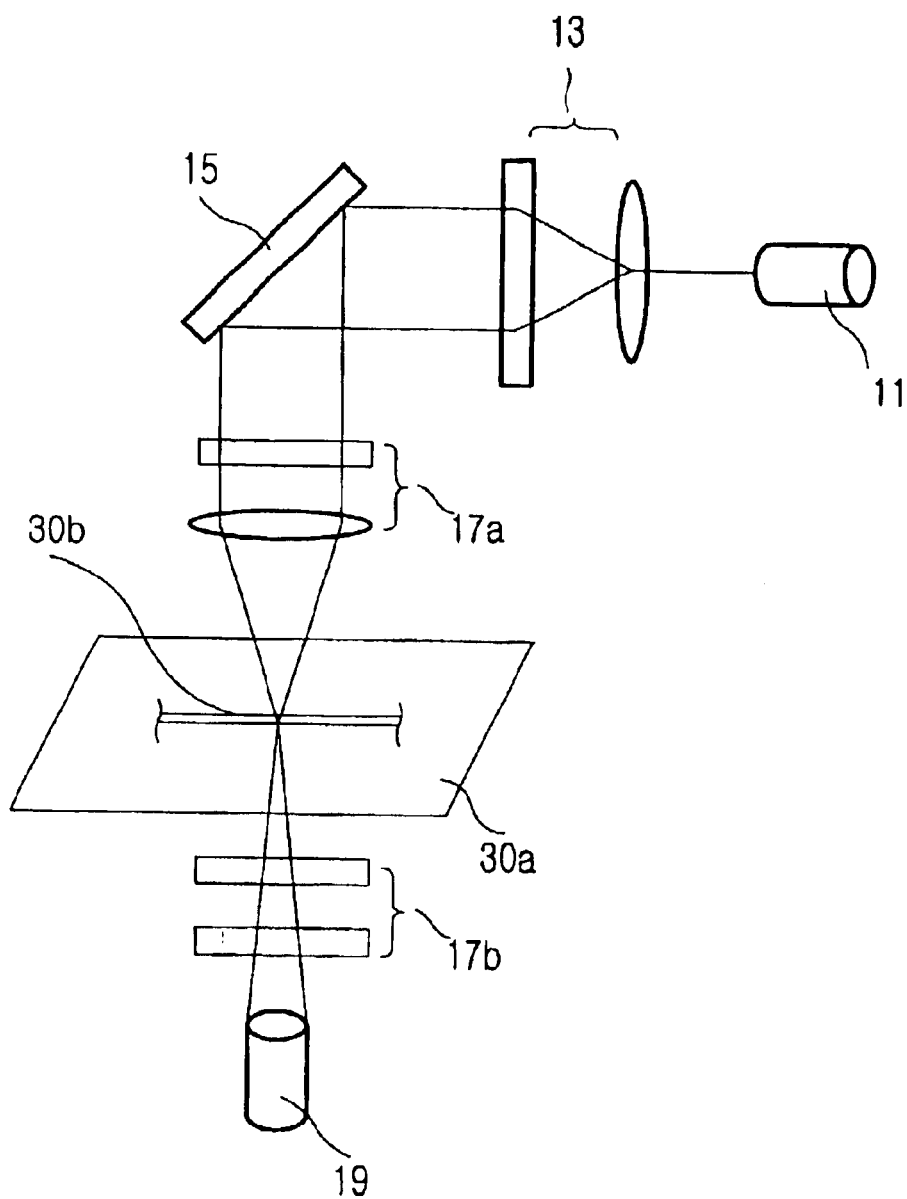
FIG. 1 is an explanatory diagram showing the device for measuring the residual stress of an optical fiber in accordance with an embodiment of a related art.
Figure 2:
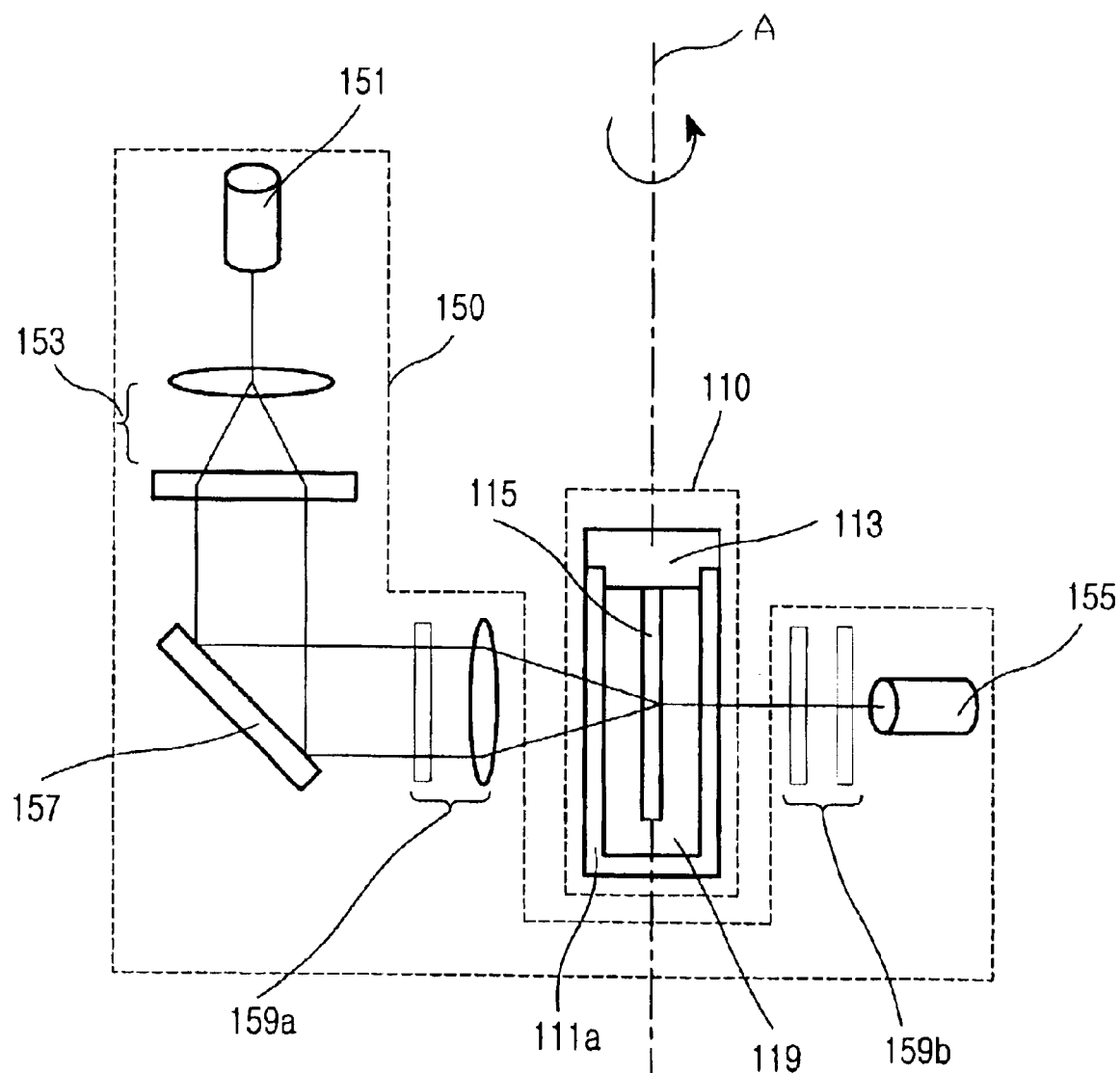
FIG. 2 is an explanatory diagram of the device for measuring the residual stress of an optical fiber in accordance with a preferred embodiment of the present invention.

FIG. 2 is an explanatory diagram of the device 100 for measuring the residual stress of an optical fiber in accordance with a preferred embodiment of the present invention. As shown in FIG. 2, the residual-stress measuring device 100 according to the embodiment of the present invention includes a fixating unit 110 and a measuring unit 150. The measuring unit 150 rotates along with the fixating unit 110 during operation and installed, as explained later, so that it can measure the residual stress in an optical fiber 115.

Figure 3:
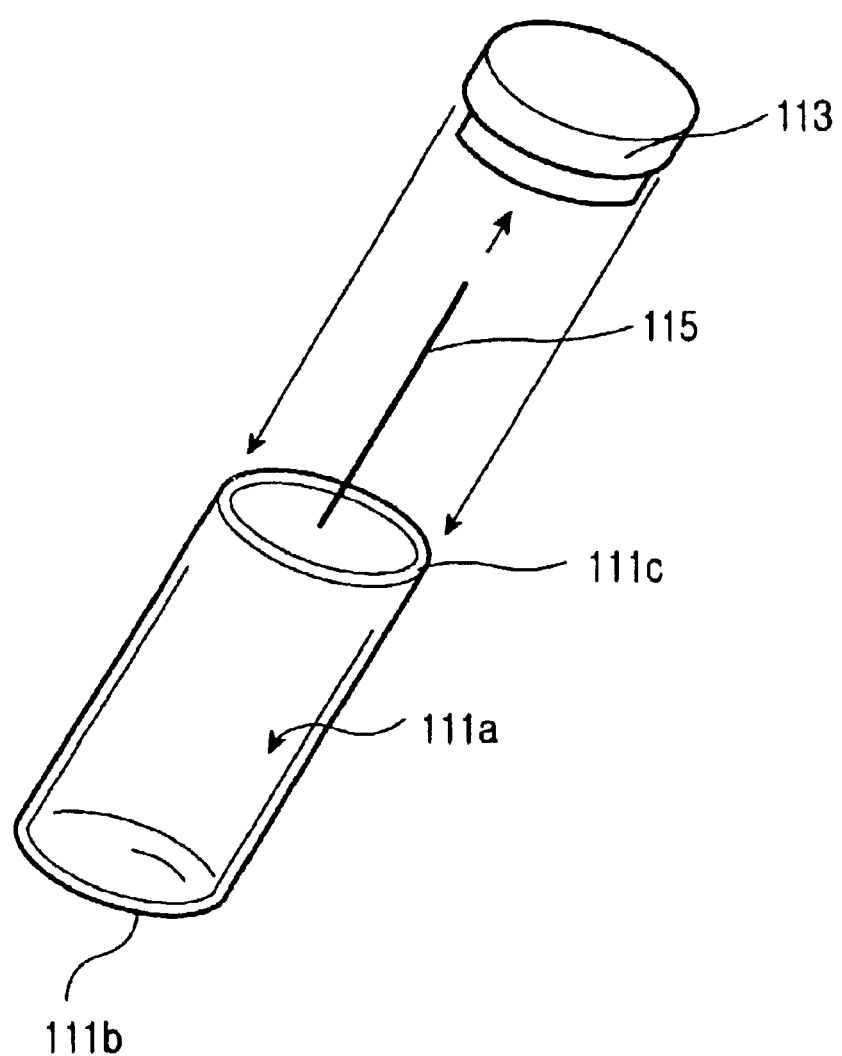
FIG. 3 depicts a partial perspective view of a fixating unit shown in FIG. 2.

FIG. 3 depicts a partial perspective view of the fixating unit 110 shown in FIG. 2. The fixating unit 110 fixates the optical fiber 115 having residual stresses to be measured and includes a quartz tube 111a and a cap 113, so that the optical fiber 115 is fixated on the cap 113 and disposed in the quartz tube 111a.

One end of the quartz tube 111a is a closed end 111b, and the other end is an open end 111c. The cap 113 is coupled to another end 111c of the quartz tube 111a, which is covered tightly with the cap 113. The optical fiber 115 is fixated on the cap 113, and the cap is put inside the quartz tube 111a filled with refractive index matching oil 119 for measuring the residual stresses in the optical fiber. This arrangement is provided to prevent any changes in the phase or path of the light, which is incident on the optical fiber 115 disposed in the quartz tube 111a during the measurement of the residual stress. Note that the stress is obtained due to the difference of the refractive index of the optical fiber 115 and the external environment, i.e., air, surrounding the optical fiber 115. Thereafter, Referring back to FIG. 2, the measuring unit 150 includes a light generator 151, a lens system 153, a objective lens unit 159a, an eyepiece lens unit 159b, a detector 155, and a reflecting mirror 157. The measuring unit 150 detects the phase changes of the light, which occurs as the light generated by the generator 151 passes through the optical fiber 115 fixated on the fixating unit 110, and based on this measurement, the residual stress in the optical fiber 115 is calculated.

Note that the spectrum of the light outputted from the light generator 151 is narrower, that is, as the wavelength of the outputted light is shorter, thus it is easier to measure the residual stress in the optical fiber as the amount of phase change when a light with short wavelength transmits the optical fiber is represented by a single value. Taking advantage of such characteristic, the preferably used light source for the light generator 151 according to the present invention may be helium-neon (He—Ne) laser or Argon ion (Ar ion) laser.

The lens system 153 converts the light generated by the light generator 151 to a plane wave. Here, at least one convex lens and one concave lens are used for the lens system. As the lenses are arrayed conforming to the curvature of the convex lens and concave lens, and to the focal distance that is dependent upon the curvature, it is possible to convert the light outputted from the light generator 151 to a plane wave.

The detector 155 detects the phase change in the light that has been outputted from the light generator 151 and passed through the optical fiber 115, which is fixated on the fixating unit 110. Preferably, a CCD array, which is capable of measuring the distribution of incident light's intensity, may be used for the detector. Note that the phase change is typically caused by the photoelastic effect due to the residual stress in the optical fiber 115. Thus, based on the phase change in the light, the residual stress in the optical fiber is calculated as the photoelastic effect where the curvature of the optical fiber 115 changes depends on whether there are residual stresses in the optical fiber 115 or depends on the directivity of the residual stress.

The reflecting mirror 157 may be optionally provided as a means of guiding the plane wave or the converted light through the lens system 153 to be incident on the optical fiber 115 that is fixated on the fixating unit 110. Generally, a mirror or other equivalent elements capable of performing a total reflection may be used as the reflecting mirror 157.

The objective lens unit 159a may be a polarizing plate and a objective lens. The polarizing plate passes light with a certain polarizing direction among the light that has been converted to a plane wave, thus helping the detector 155 to detect the phase changes of the light more easily. The objective lens unit 159a serves to compensate a possible measurement error made by the quartz tube 111a of the fixating unit 110. As the quartz tube 111a is available in a variety of shapes, it is always possible that different refractive indexes, owing to different shapes or changes in a progression path (or direction) of light according to the light's incident angle changes, can result in an error in the measurement of the residual stress of the optical fiber 115 that is fixated on the fixating unit 110. Therefore, in the present invention, the refractive curvature of the objective lens unit 159a and its curvature are selectively determined depending on the refractive index associated with the materialistic characteristic of the quartz tube 110a and different shapes, thereby compensating a possible measurement error caused by the quartz tube 111a and controlling any change in the light's progression path.

The fixating unit 110 is installed between the lens system 153 and the detector 155. Alternatively, when the reflection mirror 157 and the objective lens unit 159a are added, the fixating unit 110 is installed therebetween. As such, the measuring unit 150 measures the residual stress in the optical fiber 115, while rotating along the circumference of the optical fiber 115. As shown in FIG. 2, the central axis of the optical fiber 115 (labeled as shaft A) is fixated on the fixating unit 110.

The eyepiece lens unit 159b includes a polarization analyzer and an eyepiece lens. The incident light upon the optical fiber is polarized by the polarizing plate in the objective lens unit 159a. So, the incident light is converted to a polarized light with only one phase. If there are residual stresses in the optical fiber, the polarized light is converted to a light with two phases. The polarization analyzer in the eyepiece lens unit 159b enables the detector 155 to detect the phase difference in the light with two phases. That is, the light with two phases passes through the eyepiece lens unit 159b and is detected by the detector 155. In other words, the polarizing plate and the polarization analyzer are used especially when it is hard to detect the phase change in the wave because the plane wave incidents directly on the optical fiber 115, thereby making the light with a plurality of phases incident upon the director 155 at the same time. Accordingly, the objective lens unit 159a and the eyepiece lens unit 159b are used for enabling the detector 155 to easily detect the phase changes in the light.

As described above, the light outputted from the light generator 151 is converted to a plane wave by the lens system 153 and incident on the optical fiber 115, which is disposed in the fixating unit 110. The light, after having been converted to the plane wave by the lens system 153, is incident on the optical fiber 115 through the reflecting mirror 157. The reflecting mirror 157 is set in a manner that so the incident angle of the light onto the optical fiber 115 is perpendicular to the optical fiber 115. Meanwhile, the quartz tube 111a is filled with refractive index matching oil in order to prevent the plane wave from being distorted by other elements besides the residual stress in the optical fiber 115. Moreover, objective lens unit 159a is installed to minimize the influence of the refractive index of the quartz tube 111a and the influence of the curvature of the tube. Furthermore, the polarizing plant and the polarization analyzer are installed at the light input side to make the light incident on the optical fiber 115 and on the detector 155, respectively, to a certain direction only.

Thusly structured residual stress measuring device 100 is capable of measuring the residual stress as well as the asymmetry of the distribution of residual stresses in the optical fiber 115 fixated on the fixating unit 110 by using the measuring unit 150, i.e., the light generator 151 and the detector 155 mounted in the measuring unit 150, which are disposed to oppose to each other, having the fixating unit as a center 110, and measure the residual stress in the optical fiber 115 while rotating along with the circumference of the optical fiber 115.

In conclusion, the residual stress measuring device embodying the principles of the present invention, wherein the residual stress measuring unit measures the residual stress while rotating along with the circumference of an optical fiber, has a beneficial effect in that a more precise measurement of the distribution of residual stresses in the optical fiber as well as the measurement of asymmetry of the residual stresses in an optical fiber are realized.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for measuring residual stress in an optical fiber, comprising:
   a fixating unit for coupling the optical fiber;
   a measuring unit comprising a light generator for generating a light for measuring the residual stresses in the optical fiber and a detector for detecting phase changes of the light that has been generated by the light generator; wherein the measuring unit measures the residual stresses in the optical fiber based on the phase changes of the light passed through the optical fiber, while the measuring unit is rotating along with the circumference of the optical fiber.

2. The apparatus defined in claim 1, wherein the fixating unit comprises:
   a quartz tube having an open end and a closed end; and
   a cap detachably coupled to the open end of the quartz tube and for fixably holding the optical fiber.

3. The apparatus defined in claim 1, wherein the measuring unit further comprises a lens system for converting a light that is outputted from the light generator to a plane wave.

4. The apparatus defined in claim 2, wherein the quartz tube of the fixating unit is filled with refractive index matching oil having a refractive index matching up to a refractive index of the optical fiber.

5. The apparatus defined in claim 3, wherein the measuring unit further comprises a reflecting mirror for channeling the plane wave towards the optical fiber.

6. The apparatus defined in claim 1, wherein the measuring unit further comprises a objective lens having a refractive index and a curvature corresponding to a refractive index and a curvature of the quartz tube.

7. The apparatus defined in claim 1, wherein the light generator is one of helium-neon laser and Argon-ion laser.

8. The apparatus defined in claim 1, wherein the lens system comprises at least one convex lens and one concave lens.

* * * * *